Figure 4:
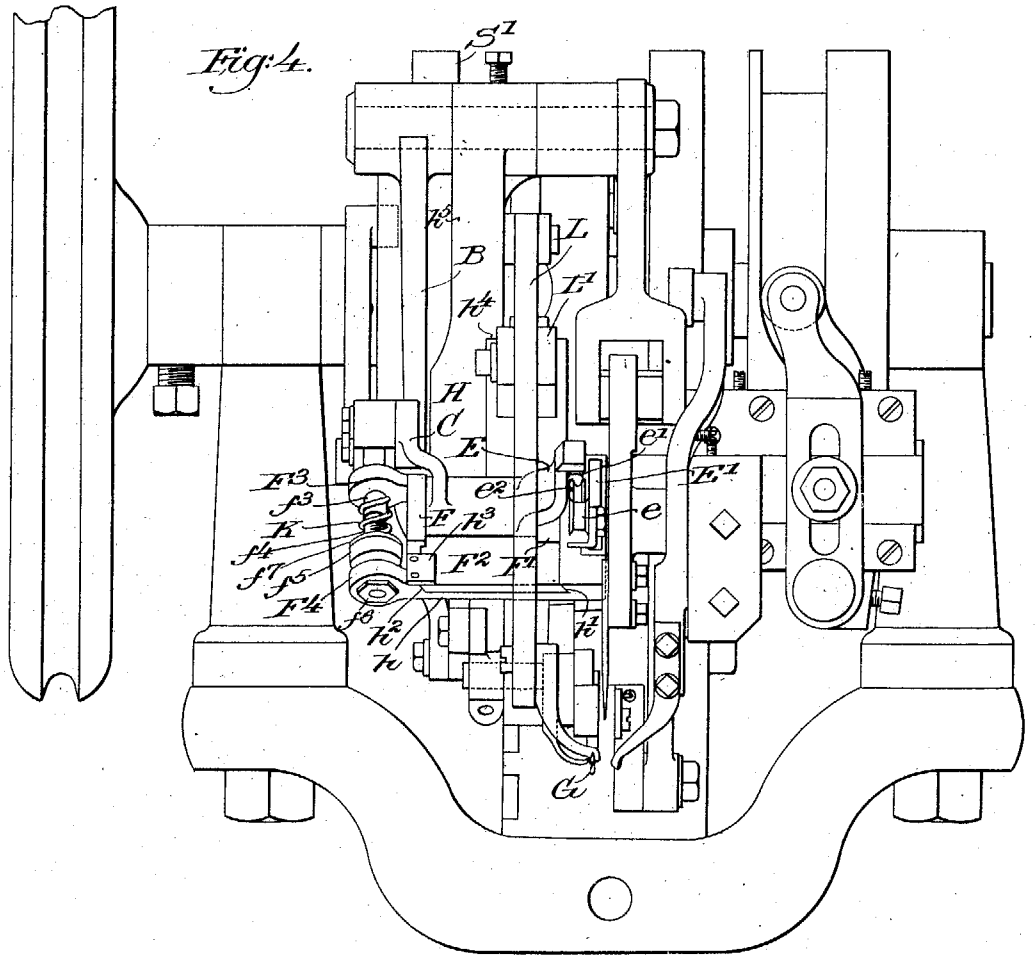

No. 11,951. Reissued Nov. 26, 1901.
S. WILLIAMS, Dec'd.
UNITED SHOE MACHINERY COMPANY, Assignee.
TAKE-UP FOR SEWING MACHINES.
(Application filed Feb. 9, 1901.)
4 Sheets—Sheet 1.
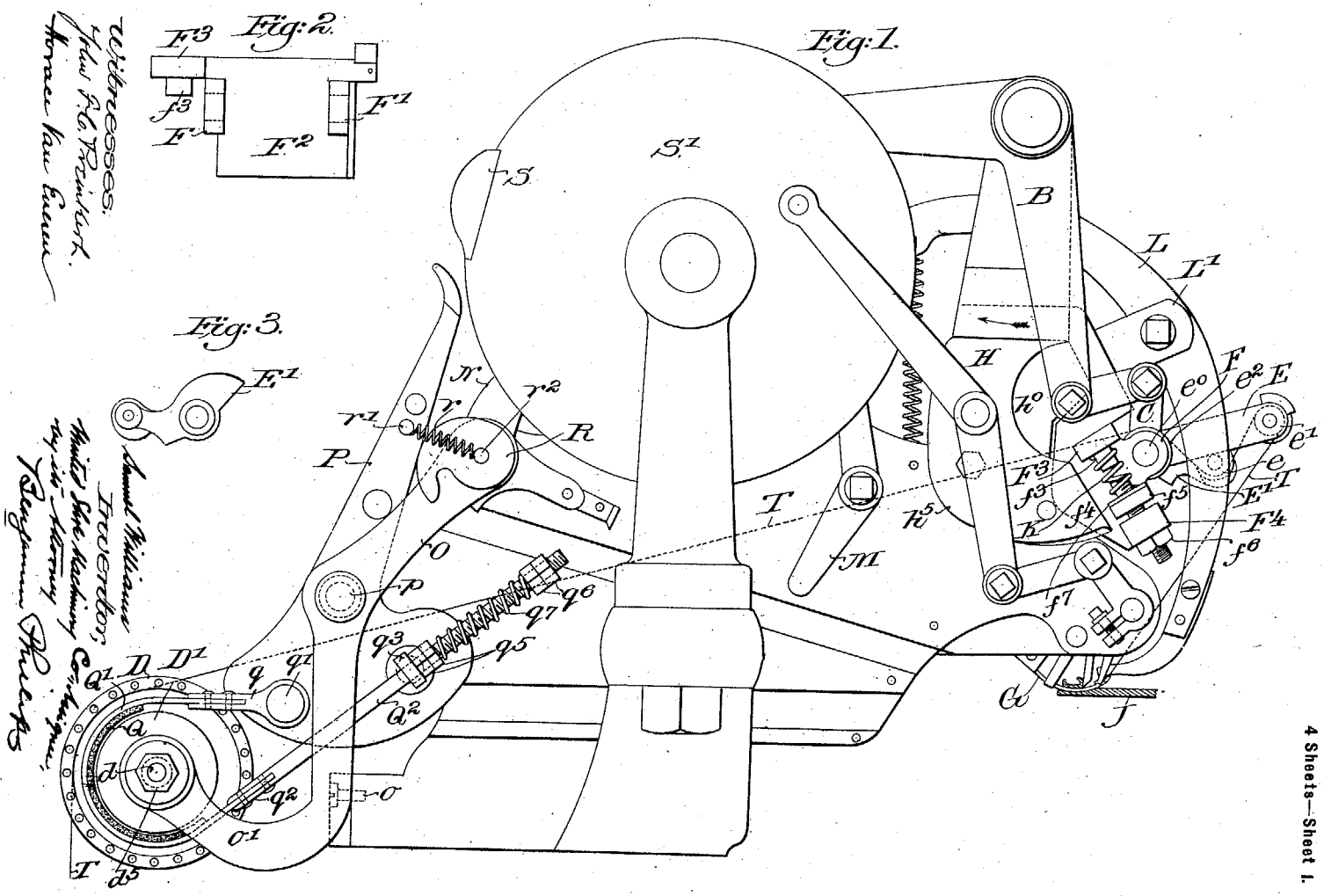
Witnesses.
John F. C. Prentkert.
Horace Van Everen
Samuel Williams
Inventor,
United Shoe Machinery Co. Assignee,
by its Attorney
Benjamin Phillips
THE NORRIS PETERS CO., WASHINGTON, D. C.

No. 11,951. Reissued Nov. 26, 1901.

S. WILLIAMS, Dec'd.

UNITED SHOE MACHINERY COMPANY, Assignee.

TAKE-UP FOR SEWING MACHINES.

(Application filed Feb. 9, 1901.)

4 Sheets—Sheet 2.

Witnesses:
John P. C. Prentiss
Horace Van Emum

Samuel Williams,
Inventor;
United Shoe Machinery Co.,
by its Attorney Assignee,
Benjamin Phillips

THE NORRIS PETERS CO., WASHINGTON, D. C.

No. 11,951. Reissued Nov. 26, 1901.

S. WILLIAMS, Dec'd.

UNITED SHOE MACHINERY COMPANY, Assignee.

TAKE-UP FOR SEWING MACHINES.

(Application filed Feb. 9, 1901.)

4 Sheets—Sheet 3.

Witnesses:
John F. C. Preinstorf
Horace Van Everen

Samuel Williams,
Inventor;
United Shoe Machinery Co.,
Assignee,
by its Attorney
Benjamin Philip

THE NORRIS PETERS CO., WASHINGTON, D. C.

No. 11,951. Reissued Nov. 26, 1901.

S. WILLIAMS, Dec'd.

UNITED SHOE MACHINERY COMPANY, Assignee.

TAKE-UP FOR SEWING MACHINES.

(Application filed Feb. 9, 1901.)

4 Sheets—Sheet 4.

Witnesses.
John F. C. Weinlich
Horace Van Ecum

Samuel Williams
Inventor.
United Shoe Machinery Co., Assignee
by its Attorney
Benjamin Phillips

THE NORRIS PETERS CO., WASHINGTON, D. C.

UNITED STATES PATENT OFFICE.

UNITED SHOE MACHINERY COMPANY, OF PATERSON, NEW JERSEY, ASSIGNEE OF SAMUEL WILLIAMS, DECEASED.

TAKE-UP FOR SEWING-MACHINES.

SPECIFICATION forming part of Reissued Letters Patent No. 11,951, dated November 26, 1901.

Original No. 634,785, dated October 10, 1899. Application for reissue filed February 9, 1901. Serial No. 46,672.

*To all whom it may concern:*

Be it known that SAMUEL WILLIAMS, formerly of New Orleans, in the parish of Orleans and State of Louisiana, now deceased, invented certain new and useful Improvements in Wax-Thread Sewing-Machines; and it is hereby declared that the following is a full, clear, and exact description of the invention, such as will enable others skilled in the art to which it appertains to make and use the same.

The present invention relates to improvements in take-up devices for wax-thread sewing-machines, and especially to that class of machines known as "inseaming-machines."

The object of the said invention is to render certain machines of this class now in use—such, for example, as the well-known Goodyear welt-sewing machine and others—capable of sewing as flat an inseam as may be done by hand and at the same time preserving the superior qualities of the chain-stitch. These objects are attained by the employment of a yielding mechanism in some portion of the take-up or thread-controlling mechanism acting upon the thread after it has left the tension-wheel graduated approximately to the breaking strain of the thread and by which as the thread is drawn near the completion of the stitch an ever-increasing strain is applied thereto until the maximum for which the device is adjusted is attained, thus avoiding any severe shock at the final pull and enabling a greater tension to be applied to the same size of thread than has hitherto been done. Likewise at the commencement of the return stroke the maximum strain is reduced gradually, thus completely setting the stitch and preventing any slip or relaxation thereof.

In order that the said invention may be more clearly understood, the same will be described with reference to the accompanying drawings, in which—

Figure 6:
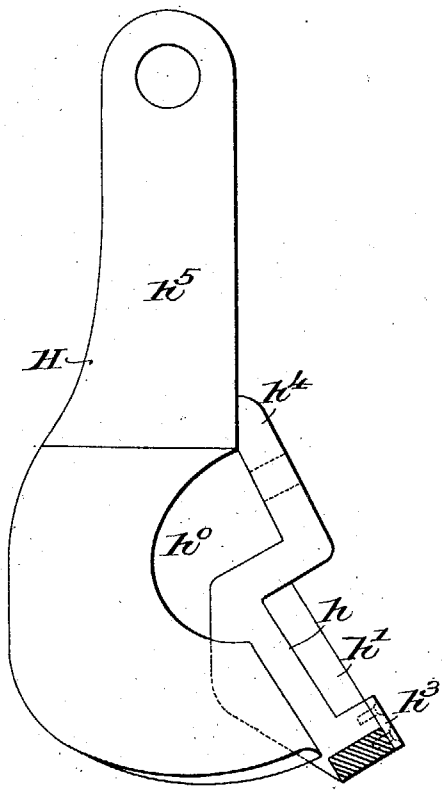
Figure 5:
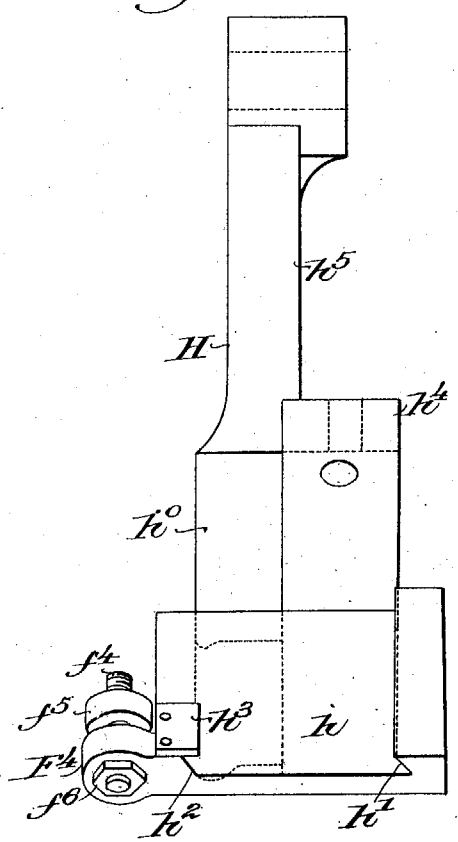
Figure 7:
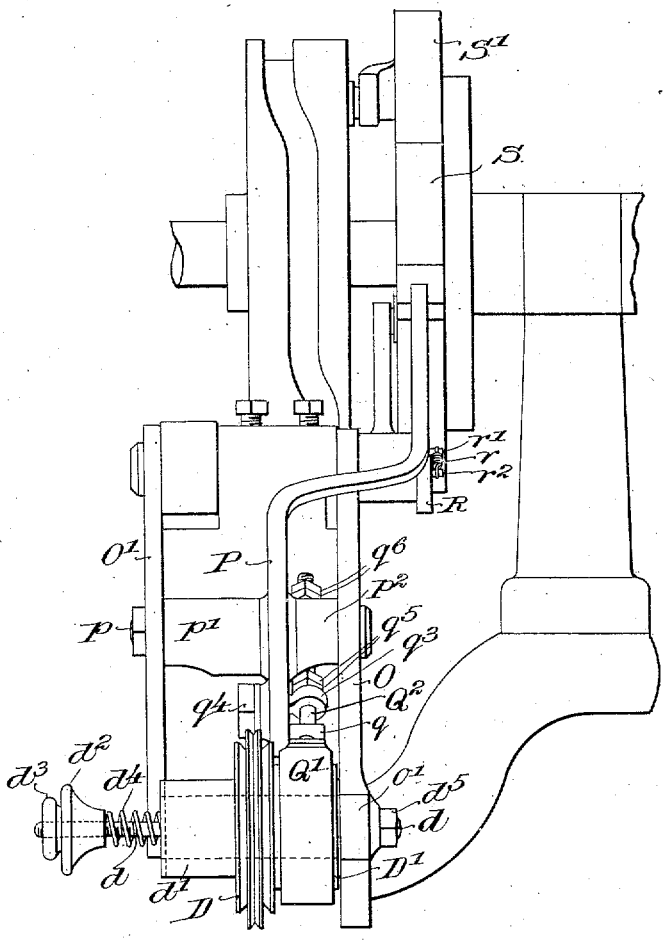

Figure 1 represents in side elevation, with portions removed, a form of Goodyear welt-machine with the improved take-up mechanism applied thereto. Fig. 2 represents a detail plan view of the take-up-lever seat. Fig. 3 represents the auxiliary take-up lever in elevation. Fig. 4 represents in front elevation the machine and attachments shown in Fig. 1 with parts removed. Fig. 5 represents in front elevation an enlarged detail view of the bracket for supporting the take-up-lever sliding seat. Fig. 6 represents the same in side elevation, and Fig. 7 is a rear elevation of part of the machine.

As the various working parts of the Goodyear welt-machine above referred to have been fully described in prior patents and as their operation is well known in the art, only those parts which operate directly with or are embodied in the present invention need be particularly herein referred to and described.

In the accompanying drawings similar parts are represented by similar letters throughout the several views.

In the form of the invention shown in the drawings the take-up lever E is mounted upon a stud $e^0$ and between the two lugs F and F′ of a sliding seat $F^2$. This sliding seat $F^2$ is provided also with a third lug $F^3$, located at one corner thereof and at right angles to the lugs F and F′ and the lug $F^3$ being provided with a stud or buffer $f^3$. (See Figs. 1, 2, and 4.)

In line with the buffer $f^3$ is the screw-threaded buffer $f^4$, which is screwed into lug $F^4$ on the stationary bracket H, the said bracket also comprising the slide-box $h$ for the take-up seat $F^2$. Mounted on the buffer $f^4$ is the adjustable stud or nut $f^5$, between which and the lug $F^3$ and coiled around the buffers $f^3$ and $f^4$ is the tension-spring K, while at the rear end of the buffer is located the check-nut $f^6$. The adjustable stud $f^5$, with buffer $f^4$ intact, limits the play of the sliding seat $F^2$. A washer $f^7$ may be inserted on the buffer $f^4$, or a plurality of such washers may be so inserted, as may be desired, for varying the compressibility of the spring K.

The edge on the right side of the seat $F^2$ is beveled and fits into recess $h'$, while the edge on the left side of said seat is similarly beveled to the bottom surface, so as to have a sliding fit between edges $h'$ and $h^2$. A cap $h^3$ prevents any tendency of said take-up-lever seat to lift during its operation. It will be noticed that this cap $h^3$ extends only about one-third of the length of sliding seat $F^2$; but this is done for compactness and is sufficient.

as the alinement of the various parts forming the take-up motion is such that the central line of force communicated by the take-up cam-lever passes through the center of the core of spring K, which arrangement prevents any cramping of sliding seat in the slide-box in operation.

The method of interchanging the compression-spring is as follows: Loosen check-nut $f^6$ and screw the stud $f^5$ backward against $F^4$, whereby the compression on spring K is entirely relieved, said spring being made just long enough to go in place without resistance when the buffers come apart to their fullest extent. Then remove cap $h^3$, Fig. 5, disconnect the connecting-rod from take-up arm C, and the take-up-lever seat can be readily lifted out of the slide-box and the compression-spring replaced by any other of suitable length and core.

The part $h^4$ of the bracket H is steadied or braced by the continuation of the upright portion $h^5$. A hollow space is formed in the bracket, as at $h^0$, and the extension of the bracket is given a curved sweep to allow the shaping in metal to be done easier.

In adapting this invention to the Goodyear welt-sewing machine it will be seen that several of the parts thereof are slightly altered. Thus instead of the ordinary bracket which supports the take-up cam-lever the bracket H is employed. There are also employed a new looper-lever L, looper-lever swivel L′, welt-guide-throw cam-lever M, the hubs of the back-gage lock-cam lever N and needle cam-lever, take-up lever E, take-up cam-lever B, auxiliary take-up lever E′, and studs for the same which are altered where necessary. The auxiliary take-up and take-up levers are provided with the thread-rollers $e$ and $e'$, respectively.

A desirable form of tension device for use in connection with the improved take-up is shown in Fig. 1. The tension-wheel D and brake-lever P of this device are mounted in a bracket O, secured to the head of machine, as at $o$. The tension-wheel D is mounted upon a stud $d$, carried by the rearwardly-extending portion $o'$ of the bracket O. The brake-lever is pivotally mounted upon a stud $p$, which is carried by the frames O and O′, and embraces hubs $p'$ and $p^2$ in its construction. A sleeve or washer $d'$ is mounted next to the tension-wheel and on the stud $d$. This stud projects out beyond the washer $d'$, where it is provided with the thumb-nuts $d^2$ and $d^3$, between which and the said washer is inserted the coil-spring $d^4$, carried upon the projecting portion of the stud $d$. The other end of the stud $d$ is held in the frame by the nut $d^5$. Secured to or integral with the tension-wheel and on the opposite side thereof from the washer $d'$ is the drum D′, upon which the brake-band Q acts. The brake-band Q, preferably of leather, forms the lining of the steel band Q′, which is secured at its upper end in a clamp $q$, which latter is pivoted, as at $q'$, to the brake-lever P, while the other end of the steel band Q is secured, as at $q^2$, to the lower end of the rod $Q^2$. A lug $q^3$, having a central aperture, is secured by the nut $q^4$ to the lower part of the cam-lever in front of the connection $q^2$. The rod $Q^2$ passes up through the aperture of the lug $q^3$, having the portion extending up beyond the lug screw-threaded. The nuts $q^5$ are placed on the rod next to the upper side of the lug $q^3$, while the extreme upper end of the rod carries the nuts $q^6$, and inserted between the nuts $q^5$ and nuts $q^6$ is the coil-spring $q^7$. By this arrangement the tension of the brake may be adjusted. Secured to the upper end of the bracket O is the brake-lever stop R, against whose eccentric periphery the tension-lever is held by the spring $r$, secured to the tension-lever, as at $r'$, and to the stud $r^2$. The brake-lever is operated by a cam-block S, dovetailed into the periphery of the thread-finger cam S′. The thread T passes from the tension-wheel D to the thread-roller $e^2$ and thence to the rollers $e$ and $e'$ of the auxiliary take-up and take-up and then to the looper, by which it is presented to the needle G.

J represents the insole being operated upon. As shown in Figs. 1 and 4, the parts are represented in the relative positions that they would occupy just as the slack-thread is taken up and just before the stitch is to be set. At this time with sufficient pressure against the tension-wheel to hold the thread from paying out, and thus holding the long end of the take-up lever from continuing its upward movement, the backward motion of the cam-lever B in the direction of the arrow causes the lug $F^3$ to advance toward the lug $F^4$, compressing the spring K until the buffers $f^3$ and $f^4$ meet—that is to say, when the take-up cam-lever begins its travel in the direction of the arrow it does not impart a positive upward movement to the outer end of the take-up lever, but instead thereof causes the buffer $f^3$ to advance toward the buffer $f^4$, all the while compressing the spring K, the connection between the take-up cam-lever and the take-up lever acting as a kind of toggle-joint, thus exerting a yielding stress on the thread until the buffers meet, when a positive upward movement of the take-up lever will then take place. There is thus an almost total pause in the drawing of the thread, the required strain being fully distributed throughout the thread before drawn off the tension-wheel, which according to the present arrangement is capable of carrying a greater pressure than with devices heretofore constructed. The tension brake-lever P is so adjusted as to clamp the tension-wheel just before the stitch is to be set and to release it before the thread is pulled off, and the cam-stop R is so secured to the bracket O that the approach of the lever P to the cam S′ may be varied. At the moment that the brake is to be applied to the tension-wheel the cam-block S engages the upper end of the brake-lever, forcing it back. This causes the lower end of the brake-lever carrying the brake-band to move forward, which obviously brings the brake-strap in engagement with the tension-wheel drum. The degree of the tension or pressure of the brake-strap on the drum is governed by the spring $q^7$, the tension of which may be varied by the adjusting-nuts $q^6$.

In regard to the adjustment of tension it will be noticed that by the present invention springs of different degrees of compressibitity may be interchanged or the compressibility varied by the insertion or removal of washers. The tension of the spring may also be varied by the adjusting-nut $f^5$. This feature, which admits of the tension of the take-up and tension devices being so readily adjusted, is a most advantageous one, inasmuch as by it the machine may be used with any size of thread from that required for the smallest baby-shoe to that required for the heaviest work and all the while utilizing the full strength of the thread. Besides the superiority of the work thus produced there will be a reduction in the time lost which would otherwise be occasioned by the breaking of the thread.

While the present invention is herein shown and described as applied to a Goodyear welt-sewing machine, the said invention is nevertheless applicable to all sewing-machines using take-up mechanism to tighten the stitch independently of the needle. An auxiliary take-up is usually employed in machines of this character to take up the slack thread as the take-up returns in the forming of a new stitch, and incidentally and to some slight degree it lessens the shock to the thread when a new supply is pulled from the tension-wheel in completing the stitch; but the two functions are different and require different conditions. An auxiliary take-up requires a considerable throw and a spring with sufficient flexibility to exercise its usefulness throughout that space, whereas the function of gradually applying strain to the thread requires but a short space for operation with a spring of rapidly-increasing resistance.

The present invention is not limited to the described details of mechanism here shown relative to a yielding mechanism embodying the principles herein set forth, as these principles can be made operative by other suitable mechanism and in any portion of the take-up or thread-controlling mechanism without departing from the spirit of the invention.

Having thus described the invention, what is claimed, and desired to be secured by Letters Patent of the United States, is—

1. In a sewing-machine, the combination with a stitch-forming mechanism comprising a needle and tension device, of a take-up lever and means for actuating the same, a yielding support to which said lever is pivoted, said yielding support, during the operation of the take-up exerting a yielding stress upon the thread between the tension device and the needle and being so adjusted that its full stress upon the thread is approximately equal to the maximum strength of the thread, the said support operating independently of the needle and exerting its greatest stress just prior to the drawing off of fresh thread for the formation of a new stitch, substantially as described.

2. In a sewing-machine, the combination with a take-up cam-lever, of two members connected together, one of said members being movable relative to the other, a take-up lever mounted upon said movable member and operatively connected with the take-up cam-lever, a spring interposed between the said members, an adjusting-nut for varying the tension of said spring, and means for interchanging said spring, substantially as described.

3. In a sewing-machine, the combination with a take-up cam-lever, of means for operating said lever, a stationary member, a yielding movable member supported by and connected with said stationary member, a take-up lever pivotally mounted on said movable member and operatively connected with said take-up cam-lever, a spring interposed between said stationary and movable members and means for adjusting the tension of said spring, substantially as described.

4. A sewing-machine, comprising a take-up mechanism including a take-up cam-lever and a take-up lever, a sliding seat upon which said take-up lever is mounted, a stationary bracket carrying said sliding seat, a resilient body interposed between said sliding seat and the stationary bracket, substantially as described.

5. A sewing-machine, comprising a take-up mechanism including a take-up cam-lever and a take-up lever, a sliding seat upon which said take-up lever is mounted, a stationary bracket carrying said sliding seat, a resilient body interposed between the said sliding seat and the stationary bracket, and means for adjusting the tension of the said resilient body, substantially as described.

6. A sewing-machine, comprising a take-up mechanism including a take-up cam-lever and a take-up lever, a sliding seat upon which said take-up lever is mounted, a stationary bracket carrying said sliding seat, a buffer carried by said sliding seat and a buffer carried by said stationary bracket, a resilient body interposed between said buffers, and means for adjusting the tension between said buffers, substantially as described.

7. A chain-stitch shoe-sewing machine, having, in combination, a hook-needle, a looper, means for intermittently locking the thread and a yielding stitch-setting take-up graduated approximately to the breaking strain of the thread acting to set the stitch while the thread is locked, substantially as described.

8. A chain-stitch shoe-sewing machine, having, in combination, a hook-needle, a looper, means for intermittently locking the thread, and a cam-actuated yieldingly-supported take-up graduated approximately to the breaking strain of the thread acting to set the stitch while the thread is locked, substantially as described.

9. A chain-stitch shoe-sewing machine, having, in combination, a hook-needle, a looper, means for intermittently locking the thread, a take-up, a cam to actuate the take-up, and a spring graduated approximately to the breaking strain of the thread acting on the take-up to resist the strain thereon of the pull of the thread, substantially as described.

In testimony whereof the UNITED SHOE MACHINERY COMPANY has caused its name to be subscribed hereto by its president hereunto duly authorized.

UNITED SHOE MACHINERY COMPANY,
By SIDNEY W. WINSLOW,
*President.*

Witnesses:
LOUIS H. BAKER,
JAMES B. GEDDES.